United States Patent
Connor et al.

(10) Patent No.: US 12,441,064 B2
(45) Date of Patent: Oct. 14, 2025

(54) UNDESIRABLE VOID IDENTIFICATION AND CORRECTION IN 3D PRINTING

(71) Applicant: MANTLE INC., San Francisco, CA (US)

(72) Inventors: Stephen T. Connor, San Francisco, CA (US); Nilesh Dixit, San Ramon, CA (US); Ivan Ionov, Moscow (RU)

(73) Assignee: MANTLE INC., San Francisco, CA (US)

( * ) Notice: Subject to any disclaimer, the term of this patent is extended or adjusted under 35 U.S.C. 154(b) by 524 days.

(21) Appl. No.: 17/883,236

(22) Filed: Aug. 8, 2022

(65) Prior Publication Data

US 2024/0042697 A1 Feb. 8, 2024

(51) Int. Cl.
| | |
|---|---|
| *B29C 64/00* | (2017.01) |
| *B29C 64/106* | (2017.01) |
| *B29C 64/209* | (2017.01) |
| *B29C 64/393* | (2017.01) |
| *B33Y 50/02* | (2015.01) |
| *B33Y 10/00* | (2015.01) |
| *B33Y 30/00* | (2015.01) |

(52) U.S. Cl.
CPC .......... *B29C 64/393* (2017.08); *B29C 64/106* (2017.08); *B29C 64/209* (2017.08); *B33Y 50/02* (2014.12); *B33Y 10/00* (2014.12); *B33Y 30/00* (2014.12)

(58) Field of Classification Search
USPC ........................................................ 700/119
See application file for complete search history.

(56) References Cited

U.S. PATENT DOCUMENTS

| | | | |
|---|---|---|---|
| 10,520,923 B2 | 12/2019 | Connor et al. | |
| 2015/0066440 A1* | 3/2015 | Chen ....................... | G06T 17/00 703/1 |
| 2017/0165917 A1* | 6/2017 | McKiel, Jr. ........... | B29C 64/393 |
| 2018/0095450 A1* | 4/2018 | Lappas ................. | B33Y 10/00 |

(Continued)

OTHER PUBLICATIONS

WO_2019008355_A1 (Year: 2019).*

(Continued)

*Primary Examiner* — Hien D Khuu
(74) *Attorney, Agent, or Firm* — MH2 Technology Law Group LLP

(57) ABSTRACT

A system for, and method of, printing a three-dimensional (3D) object are presented. The techniques can include obtaining a three-dimensional virtual representation of the object; obtaining first and second 3D printing strategies; obtaining first and second virtual extrusion renderings, wherein the virtual extrusion renderings corresponds to first and second toolpaths for a deposition layer of the object according to the first and second 3D printing strategies; performing first and second comparisons of, respectively, the first and second virtual extrusion renderings to a corresponding portion of the three-dimensional virtual representation of the object; determining, based on the first and second comparisons, respectively, first and second regions of the object that do not intersect the virtual extrusion rendering; providing an output 3D printing strategy for the deposition layer of the object selected from among the first and second 3D printing strategies based on the first and second regions of the object.

22 Claims, 10 Drawing Sheets

(56) References Cited

U.S. PATENT DOCUMENTS

| | | | |
|---|---|---|---|
| 2018/0356794 A1* | 12/2018 | Wiedenhoefer | B29C 64/393 |
| 2018/0370145 A1* | 12/2018 | Woytowitz | B33Y 50/00 |
| 2019/0361426 A1* | 11/2019 | Connor | B33Y 50/02 |
| 2020/0096971 A1 | 3/2020 | Connor et al. | |
| 2020/0346420 A1* | 11/2020 | Friedrich | B32B 5/04 |
| 2020/0361155 A1 | 11/2020 | Jones et al. | |
| 2022/0024135 A1 | 1/2022 | Alcantara Marte et al. | |
| 2024/0109244 A1* | 4/2024 | McKiel | B33Y 50/00 |

OTHER PUBLICATIONS

CN_109643103_A (Year: 2019).*
PCT Notification of Transmittal of the International Search Report and the Written Opinion of the International Searching Authority, or the Declaration mailed Nov. 27, 2023 in corresponding international Application No. PCT/US2023/029621, 8 pages.

\* cited by examiner

UNDESIRABLE VOID IDENTIFICATION AND CORRECTION IN 3D PRINTING

FIELD

This disclosure relates generally to three-dimensional (3D) printing.

BACKGROUND 3D printing an object according to a computer controlled hybrid process can include one or more additive steps, e.g., deposition of one or more layers of paste by extrusion, one or more transformative steps, e.g., drying the deposited paste, and one or more subtractive steps, e.g., machining portions of the printed part. In general, 3D printing an object can proceed in layers according to a Cartesian coordinate system oriented such that each layer is parallel to the XY plane, representing the horizontal surface of the Earth, with additional layers added to extend the object in the Z-axis direction, representing up and down relative to gravity.

Generally, the additive step involves depositing one or more layers of paste, where each layer is in the XY plane. Deposition of paste at each additive step may be according to a toolpath, in which material is extruded to form a layer, e.g., using geometric filling strategies (such as, by way of non-limiting example, rectilinear, serpentine, concentric loops). Toolpaths can be ordered so as to fill a given space with minimal or reduced undesirable overlaps and undesirable voids. Additional layers may be added to build the object in the Z axis direction. In general, increasingly or maximally continuous paths are preferred so as to have as few separate toolpaths as possible. For example, within each layer, it is faster to dispense one continuous path of paste out of a nozzle than it is to start and stop dispensing material at different locations.

The subtractive step removes material away after the additive step, which provides for more allowable deviations from the original shape. Therefore, adding material at corners can be done without causing worse performance. In general, a subtractive step may follow the additive step for each layer. Some hybrid printing processes apply the subtractive step to remove at least some material from all, or substantially all, surfaces. For example, the subtractive phase may include removing material from top, bottom, and/or side surfaces of any regions of a printed layer (e.g., facing, contouring, undercutting). Subsequent to the additive and subtractive step of each layer, the resulting layer may have a predetermined layer height.

To 3D print an object, a computer program, generally known as a "slicer", accepts as input a 3D virtual representation of the object, e.g., as generated by a Computer Aided Design (CAD) system, as well as 3D printer parameters such as nozzle width and print speed. The slicer generates computer instruction that the 3D printer processes to print the object. Such instructions may be in the form of a GCode file, known to those of skill in the art. In particular, the instructions describe a toolpath that directs the tools of the 3D printer that perform the additive, transformative, and subtractive steps.

Further background appears in U.S. Pat. No. 10,520,923, which is hereby incorporated by reference herein in its entirety.

SUMMARY

According to various embodiments, a method of printing a three-dimensional (3D) object is presented. The method includes: obtaining a three-dimensional virtual representation of the object; obtaining a first 3D printing strategy; obtaining a second 3D printing strategy; obtaining a first virtual extrusion rendering, where the first virtual extrusion rendering corresponds to a first toolpath for a deposition layer of the object according to the first 3D printing strategy; obtaining a second virtual extrusion rendering, where the second virtual extrusion rendering corresponds to a second toolpath for a deposition layer of the object according to the second 3D printing strategy; performing a first comparison of the first virtual extrusion rendering to a corresponding portion of the three-dimensional virtual representation of the object; determining, based on the first comparison, a first region of the object that does not intersect the virtual extrusion rendering; performing a second comparison of the second virtual extrusion rendering to a corresponding portion of the three-dimensional virtual representation of the object; determining, based on the second comparison, a second region of the object that does not intersect the virtual extrusion rendering; and providing an output 3D printing strategy for the deposition layer of the object selected from among the first 3D printing strategy and the second 3D printing strategy based on the first region of the object and the second region of the object.

Various optional features of the above embodiments include the following. The method may further include three-dimensional printing the object based on the output 3D printing strategy. The method may further include determining a size of the first region and a size of the second region, and selecting, automatically, the output printing strategy based at least on a comparison of the size of the first region to the size of the second region. The method may further include: displaying a representation of the first comparison; displaying a representation of the second comparison; and receiving a user selection of the output 3D printing strategy from among the first 3D printing strategy and the second 3D printing strategy. At least one of the first 3D printing strategy or the second 3D printing strategy may include roads of a plurality of different widths. At least one of the first 3D printing strategy or the second 3D printing strategy may include a rectilinear toolpath and a concentric toolpath. At least one of the first 3D printing strategy or the second 3D printing strategy may include a toolpath for a deposition layer of the object having an angle less than 180°, and the output 3D printing strategy may include a toolpath on an exterior of the angle adjacent to a negative feature. At least one of the first 3D printing strategy or the second 3D printing strategy may include a chopped loop toolpath. At least one of the first 3D printing strategy or the second 3D printing strategy may include an elongated or stretched corner. The performing the first comparison of the first virtual extrusion rendering to the corresponding portion of the three-dimensional virtual representation of the object may include comparing the first virtual extrusion rendering to a virtual slice of the three-dimensional virtual representation of the object, and the performing the second comparison of the second virtual extrusion rendering to the corresponding portion of the three-dimensional virtual representation of the object may include comparing the second virtual extrusion rendering to a virtual slice of the three-dimensional virtual representation of the object. The three-dimensional virtual representation of the object may include a computer-aided design (CAD) rendering. The obtaining a three-dimensional virtual representation of the object, the obtaining a first 3D printing strategy, the obtaining a second 3D printing strategy, the obtaining a first virtual extrusion rendering, the obtaining a second virtual extrusion rendering, the performing a first comparison, the determining a first region of the object that does not intersect the virtual extrusion rendering, the performing a second comparison, and the determining a second region of the object that does not intersect the virtual extrusion rendering, are performed for each of a plurality of deposition layers of the object. The second 3D printing strategy may include a modification of the first 3D printing strategy, and the providing the output 3D printing strategy may include providing the second 3D printing strategy.

According to various embodiments, a system for printing a three-dimensional (3D) object is presented. The system includes an electronic processor and persistent memory including instructions that, when executed by the electronic processor, configure the electronic processor to perform actions including: obtaining a three-dimensional virtual representation of the object; obtaining a first 3D printing strategy; obtaining a second 3D printing strategy; obtaining a first virtual extrusion rendering, where the first virtual extrusion rendering corresponds to a first toolpath for a deposition layer of the object according to the first 3D printing strategy; obtaining a second virtual extrusion rendering, where the second virtual extrusion rendering corresponds to a second toolpath for a deposition layer of the object according to the second 3D printing strategy; performing a first comparison of the first virtual extrusion rendering to a corresponding portion of the three-dimensional virtual representation of the object; determining, based on the first comparison, a first region of the object that does not intersect the virtual extrusion rendering; performing a second comparison of the second virtual extrusion rendering to a corresponding portion of the three-dimensional virtual representation of the object; determining, based on the second comparison, a second region of the object that does not intersect the virtual extrusion rendering; and providing an output 3D printing strategy for the deposition layer of the object selected from among the first 3D printing strategy and the second 3D printing strategy based on the first region of the object and the second region of the object.

Various optional features of the above embodiments include the following. The system may include a three-dimensional printer, and the actions may include the three-dimensional printer three-dimensional printing the object based on the output 3D printing strategy. The actions may further include: determining a size of the first region and a size of the second region, and selecting, automatically, the output printing strategy based at least on a comparison of the size of the first region to the size of the second region. The actions may further include: displaying a representation of the first comparison; displaying a representation of the second comparison; and receiving a user selection of the output 3D printing strategy from among the first 3D printing strategy and the second 3D printing strategy. At least one of the first 3D printing strategy or the second 3D printing strategy may include roads of a plurality of different widths. At least one of the first 3D printing strategy or the second 3D printing strategy may include a rectilinear toolpath and a concentric toolpath. At least one of the first 3D printing strategy or the second 3D printing strategy may include a toolpath for a deposition layer of the object having an angle less than 180°, and the output 3D printing strategy may include a toolpath on an exterior of the angle adjacent to a negative feature. At least one of the first 3D printing strategy or the second 3D printing strategy may include a chopped loop toolpath. At least one of the first 3D printing strategy or the second 3D printing strategy may include an elongated or stretched corner. The performing the first comparison of the first virtual extrusion rendering to the corresponding portion of the three-dimensional virtual representation of the object may include comparing the first virtual extrusion rendering to a virtual slice of the three-dimensional virtual representation of the object, and the performing the second comparison of the second virtual extrusion rendering to the corresponding portion of the three-dimensional virtual representation of the object may include comparing the second virtual extrusion rendering to a virtual slice of the three-dimensional virtual representation of the object. The three-dimensional virtual representation of the object may include a computer-aided design (CAD) rendering. The actions may further include performing for each of a plurality of deposition layers of the object: the obtaining a three-dimensional virtual representation of the object, the obtaining a first 3D printing strategy, the obtaining a second 3D printing strategy, the obtaining a first virtual extrusion rendering, the obtaining a second virtual extrusion rendering, the performing a first comparison, the determining a first region of the object that does not intersect the virtual extrusion rendering, the performing a second comparison, and the determining a second region of the object that does not intersect the virtual extrusion rendering. The second 3D printing strategy may include a modification of the first 3D printing strategy, and the providing the output 3D printing strategy may include providing the second 3D printing strategy.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
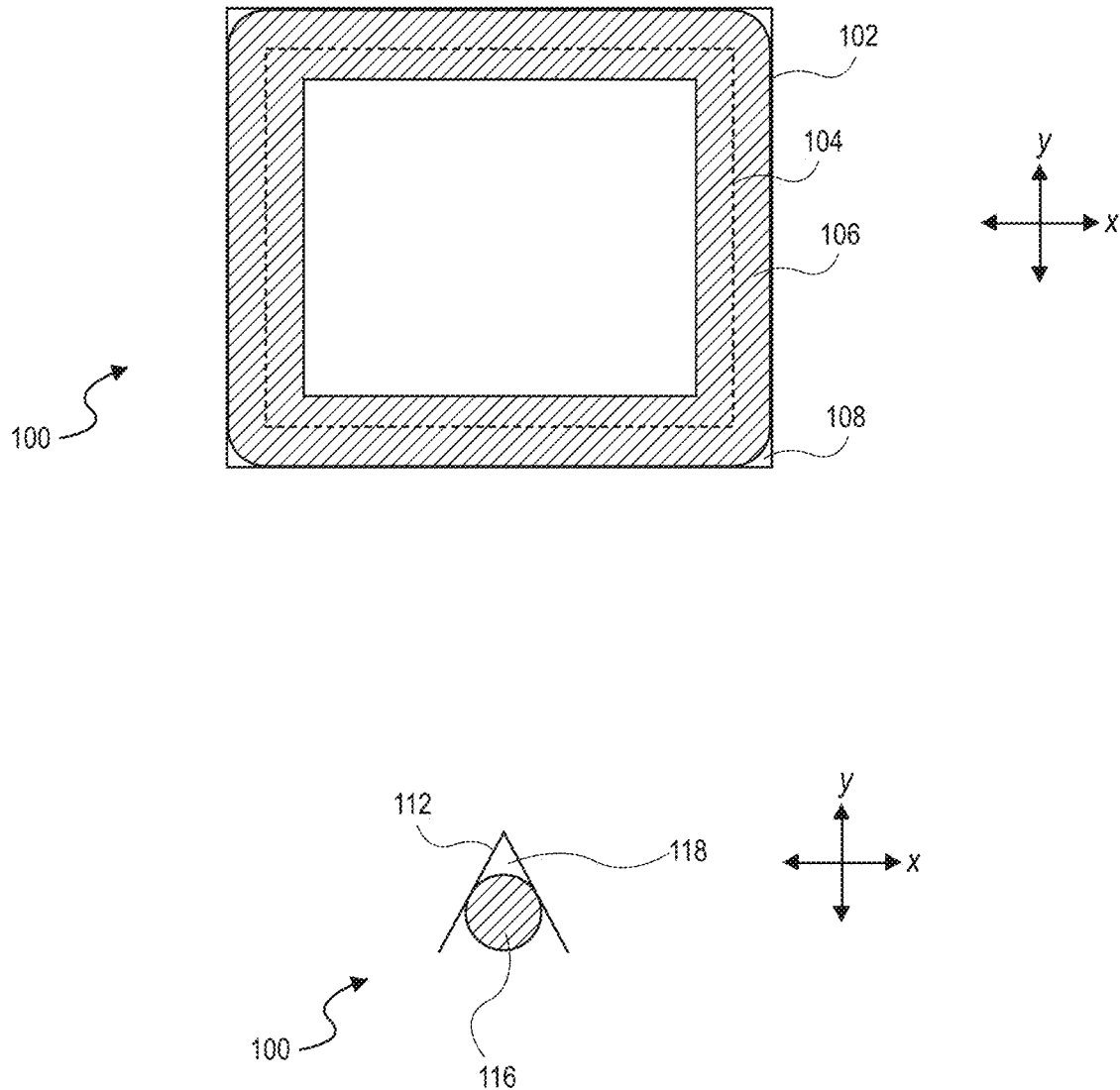
FIG. 1 depicts examples of undesirable voids in 3D printing.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

In the additive step of a 3D printing process in which a material is extruded, software, such as a slicer, determines a toolpath that specifies where material is to be extruded. In general, the size and resolution of the printed features are determined by the dimensions (width and height) of the extruded line, commonly referred to as a "road." Roads are extruded by moving a dispensing tool along a predetermined toolpath while extruding material. Roads have an associated width, which may be characterized as the spacing between parallel toolpaths such that extrusion fills an area homogeneously. Changes of direction of the extruded line results in a curve, rather than a sharp corner, because the smallest extruded line is a dot, i.e., a circle, the diameter of a road. These problems can occur both in the XY plane and in the XZ (or YZ) plane. Accordingly, fine feature, e.g., features with dimensions less than the width and/or height of the road, generally cannot be printed without leaving undesirable voids or overlaps. An undesirable void may include a region in which adjacent toolpaths overlap with less than a critical length, producing a region with too little extruded material. An undesirable overlap may include a region in which adjacent toolpaths overlap with greater than a critical length, producing a region with too much extruded material. (The actual value of the critical length may depend on the paste properties (e.g., viscosity, drying time, etc.) and printing conditions (e.g., feed rate, dispense rate, layer thickness, etc.).) Further, sharp corners, e.g., infill corners having acute angles, generally cannot be printed without leaving undesirable voids. Yet further, overlap of printed roads, e.g., when printing roads with acute angles, is undesirable, because addition material is deposited in overlapping area, which forms a region with greater thickness. Thickness variations can lead to defects in extrusion processes, material that is thicker or thinner than intended will not be processed by subsequent steps equivalently and will change the deposition surface and quality of subsequent layers. The subsequent subtractive step may remove some overextruded material such as that which is laterally squeezed out of overlapping areas near an edge.

Various embodiments solve the problems of undesirable voids and lack of ability to 3D print fine features. Toolpaths may be generated to increase or maximize the contiguous length and minimize or reduce the number of noncontiguous toolpaths which can fill a given area. The generation of toolpaths may also be designed to minimize or reduce the generation of undesirable voids and undesirable overlaps between adjacent toolpaths. Some embodiments utilize printing strategies that generate toolpaths for the additive step of a 3D printing process that reduce or omit undesirable voids. For example, according to various embodiments, some printing strategies elongate or stretch corners at extrusion toolpaths so that the material is also deposited in these areas that otherwise would be left unfilled or as undesirable voids.

Some embodiments correct for, or avoid, various extrusion defects. For example, some embodiments correct or avoid lateral overextrusion, e.g., when excess material is deposited such that a printed road has lateral dimensions greater than the predetermined width of the toolpath. Lateral deviations greater than 10% of the predetermined toolpath width may create defects due to presence of material in undesired locations. Some embodiments correct or avoid vertical overextrusion, e.g., when excess material is deposited such that the height of a section of a layer is greater than the predetermined layer height. Height deviations greater than 25% of the predetermined extruded layer height may create defects during operations following extrusion. Some embodiments correct or avoid lateral underextrusion, e.g., when insufficient material is deposited such that a printed road has lateral dimensions less than the predetermined width of the toolpath. Some embodiments correct or avoid vertical underextrusion, e.g., when insufficient material is deposited such that the height of a section of a layer is lesser than the predetermined layer height.

Some embodiments detect undesirable voids that a particular printing strategy would produce by virtually rendering a standard toolpath as a set of thick lines to simulate extruded paste roads, virtually modeling the input part section at the same Z axis level (e.g., from the CAD model), and comparing both images. Areas of the modeled part that are not filled with virtual paste are identified as undesirable voids or unfilled corners. It can be appreciated that unfilled corners are a type of undesirable voids.

Some embodiments, after detecting the undesirable voids that a particular printing strategy would produce, create additional toolpaths to fill the identified undesirable voids.

Some embodiments check multiple 3D printing strategies for their potential to leave undesirable voids. Some embodiments compare a plurality of printing strategies, which may be computer selected or selected by a user. Some embodiments automatically select a printing strategy to implement from a plurality of printing strategies based at least in part on their ability to omit undesirable voids. Some embodiments display the virtual results of multiple printing strategies so that a user can select a printing strategy to implement.

Accordingly, some embodiments allow for automatic or guided additive printing strategy selection, which reduces or eliminates undesirable voids.

These and other features and advantages are disclosed in detail presently.

FIG. 1 depicts examples 100, 110 of undesirable voids 108, 118 in 3D printing. The first example 100 shows a single concentric path of a single layer of a rectangular object 102 in the XY plane. A toolpath may exactly match a desired shape, yet still produce undesirable voids. Even with a rectangular concentric toolpath 104, the road 106 leaves undesirable voids 108 at the corners. This is an example of a change of direction of the extruded path resulting in a curve, rather than a sharp corner. The second example 110 shows a layer of an object 112 that includes an acute angle. Because the smallest extruded line is a dot 116, i.e., a circle, the deposition leaves an undesirable void 118 at the corner inside of the acute angle.

Figure 2:
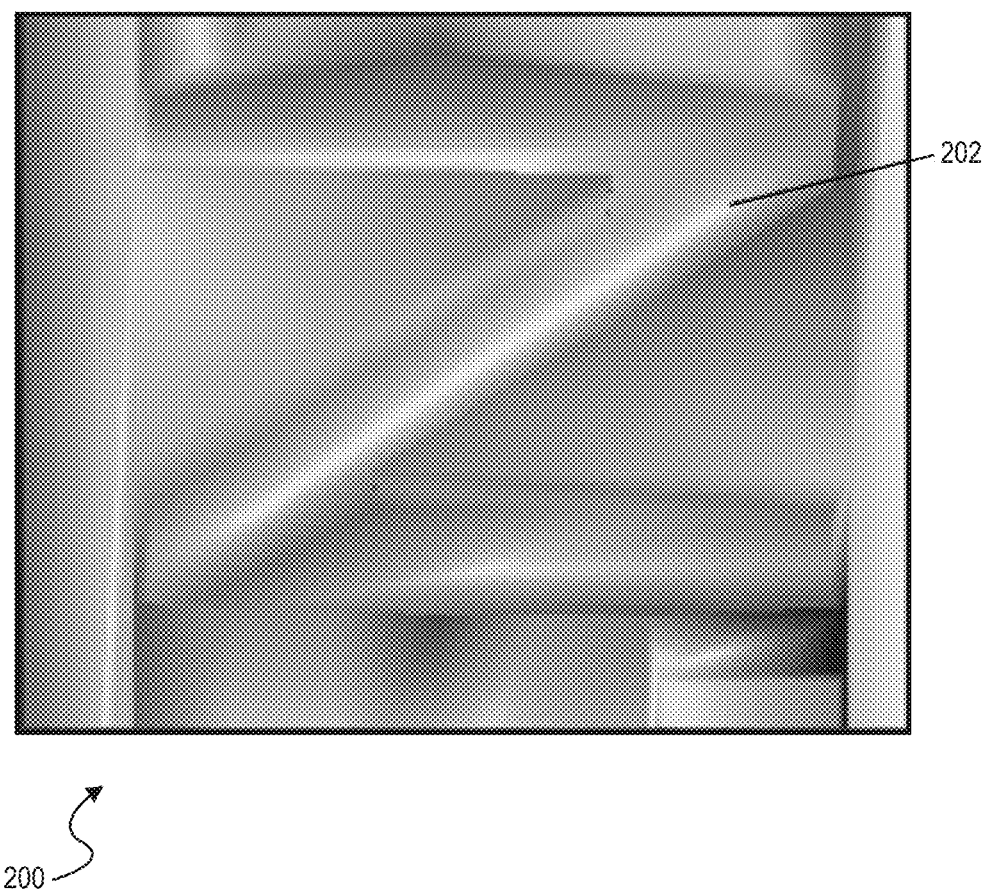
FIG. 2 depicts a 3D virtual representation of an object according to various embodiments.

FIG. 2 depicts a 3D virtual representation of an object 200 according to various embodiments. The object 200 defines a Z-shaped negative feature (or "gap") 202. In general, a negative feature may include an area in a layer in which extruded material is intentionally absent, in contrast to a positive feature, which may include an area in a layer where material is intentionally present. The object 200 may have a variety of three-dimensional virtual representations, that is, computer-implemented representations. Such representations can include Computer Aided Design (CAD) representations. Such representations can include mesh representations. The object as shown in FIG. 2 includes acute angles in the crooks of the Z-shaped negative feature.

Figure 3:
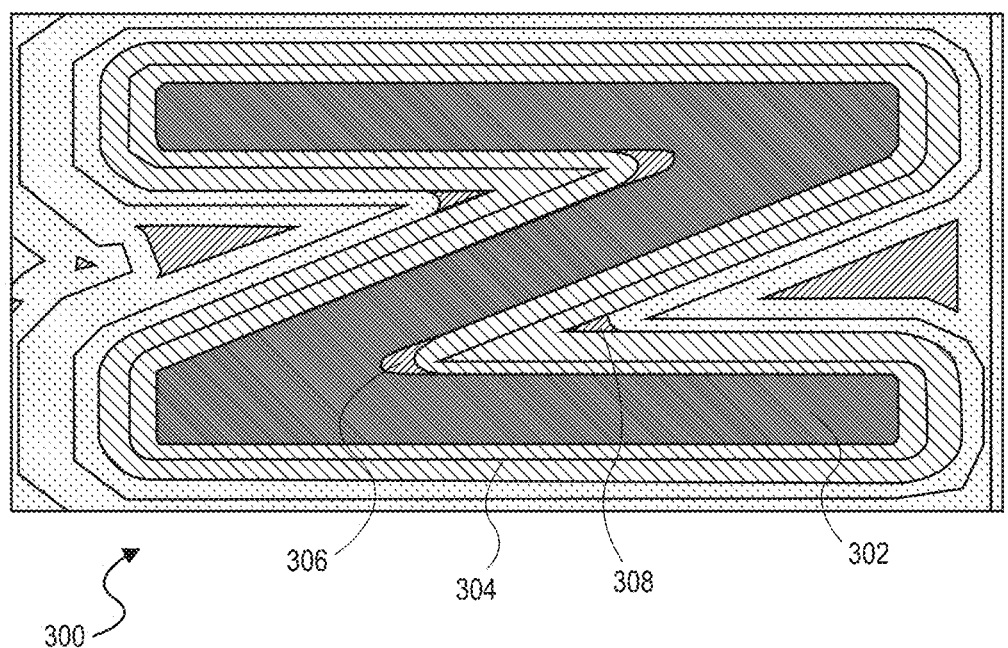
FIG. 3 depicts a virtual extrusion rendering of a layer of the object of FIG. 2 showing undesirable voids at corners according to various embodiments.

FIG. 3 depicts a virtual extrusion rendering 300 for a layer of the object of FIG. 2 showing undesirable voids at corners according to various embodiments. Such renderings may be generated for a given toolpath produced by a 3D printing strategy according to various embodiments. As shown, virtual extrusion rendering 300 includes deposition roads about generated toolpaths 304. Each road is represented by a thick line about the toolpath. Such a road representation may be generated by, for example, passing the center of a circle with diameter equal to the road width along the toolpath and recording areas intersected by the circle. A perimeter road bounds the Z-shaped negative feature 302. However, due to the road width, as represented in FIG. 3, undesirable voids, e.g., undesirable void 306, appear in the crooks of the acute angles of, and adjacent to, the Z-shaped negative feature 302. Further, due to road width, undesirable voids, e.g., undesirable void 308, appear adjacent to toolpaths further inside the shape due to the acute angles of the Z-shaped negative feature 302.

Such undesirable voids may be automatically detected according to various embodiments by comparing the virtual extrusion rendering 300 with a corresponding horizontal section of the 3D virtual representation of the object 200 as shown in FIG. 2. Using known techniques, a computer program may obtain such a horizontal section of the 3D virtual representation of the object 200 that corresponds to the virtual extrusion rendering 300 layer. The horizontal section may be registered to the virtual extrusion rendering 300. After such registration, areas of the horizontal section that do not intersect the virtual extrusion rendering 300 correspond to undesirable voids 306. Thus, undesirable voids 306 may be detected for a given 3D printing strategy in silico without requiring actual 3D printing extrusion deposition.

Figure 4:
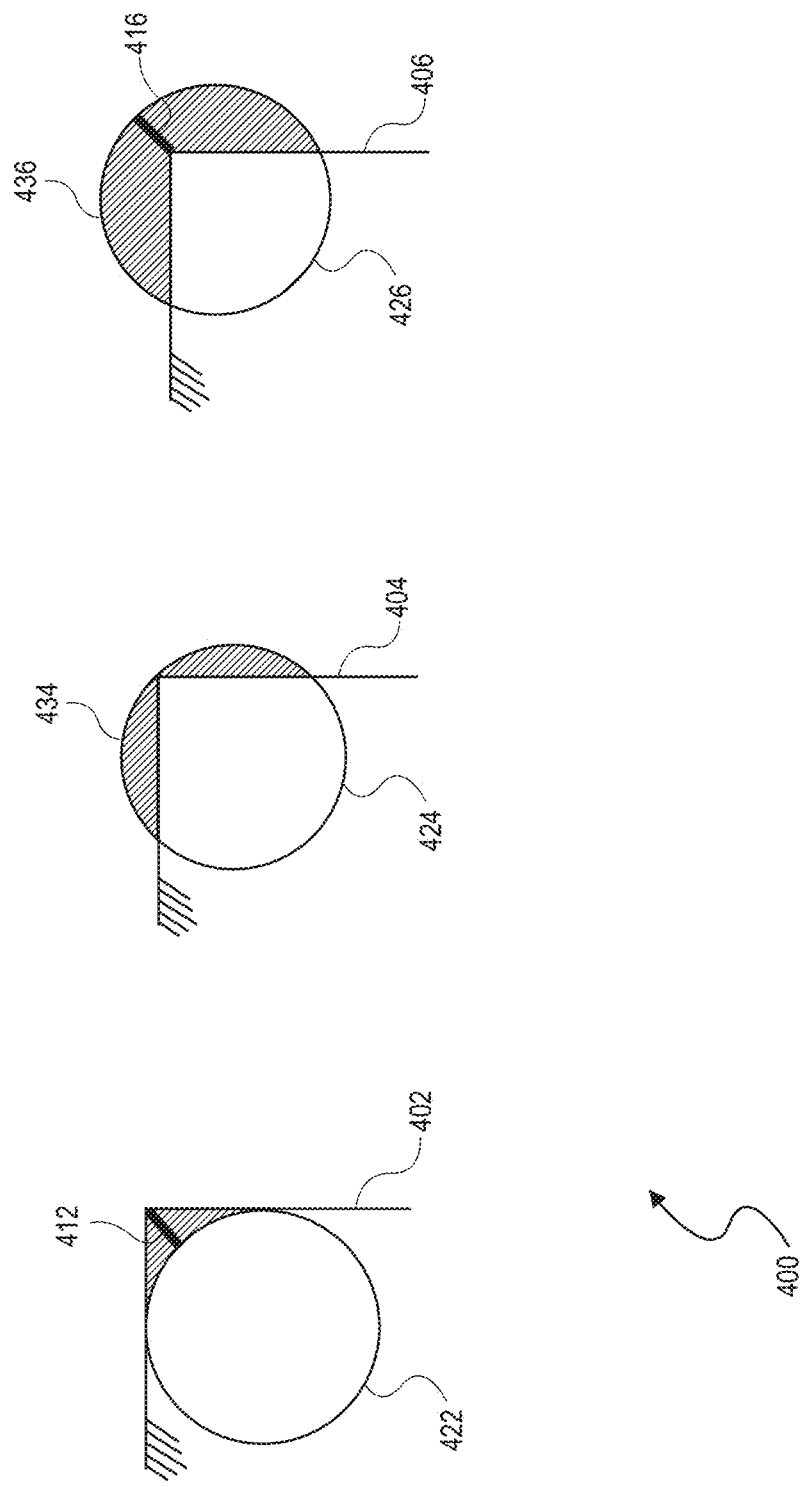
FIG. 4 depicts various overlap lengths of virtual extrusion renderings for 90° corners of an object according to various embodiments.

FIG. 4 depicts various overlap lengths 412, 416 of virtual extrusion renderings 400 for 90° corners of an object 402, 404, 406 according to various embodiments. As described above in reference to FIG. 3, some embodiments perform undesirable void recognition by tracing a circular brush around the toolpath of a sliced layer of a volume. The circle will leave undesirable voids at corners, and such undesirable void areas can be corrected by flowing sufficient paste such that enough material is printed on an edge to permit subsequent material removal in the subtractive step to leave the desired shape without an undesirable void.

Thus, FIG. 4 depicts techniques for characterizing such sufficient paste flow. According to some embodiments, the length from the nearest part of the tracing circle to the corner of an angle is referred to as "overlap length." The extrusion rendering for part 402 shows a circle that does not overlap the corner of part 402. Thus, the extrusion rendering for part 402 has a negative overlap length 412. The extrusion rendering for part 404 shows a circle that exactly intersects the corner of part 404. Thus, the extrusion rendering for part 404 has a zero overlap length. The extrusion rendering for part 406 shows a circle that extends past the corner of part 406. Thus, the extrusion rendering for part 406 has a positive overlap length 416.

According to some embodiments, a 3D printing strategy ensures that overlap length is positive for some or all corners of angles. Some embodiments specify, e.g., allowing a user to set a minimum overlap value. Some use a maximum angle under which an overlap is used, in some embodiments the overlap is constant and in others it is a function of the corner angle. Some embodiments set a minimum overlap value for a 3D printing strategy by setting an amount of material that is to be on the outside of part to cut away during the subtractive step and leave well-defined features. Some embodiments set a maximum overlap value according to an amount that paste can be printed over empty space without being distorted downwards by gravity and surface tension with the vertical wall below it.

Figure 5:
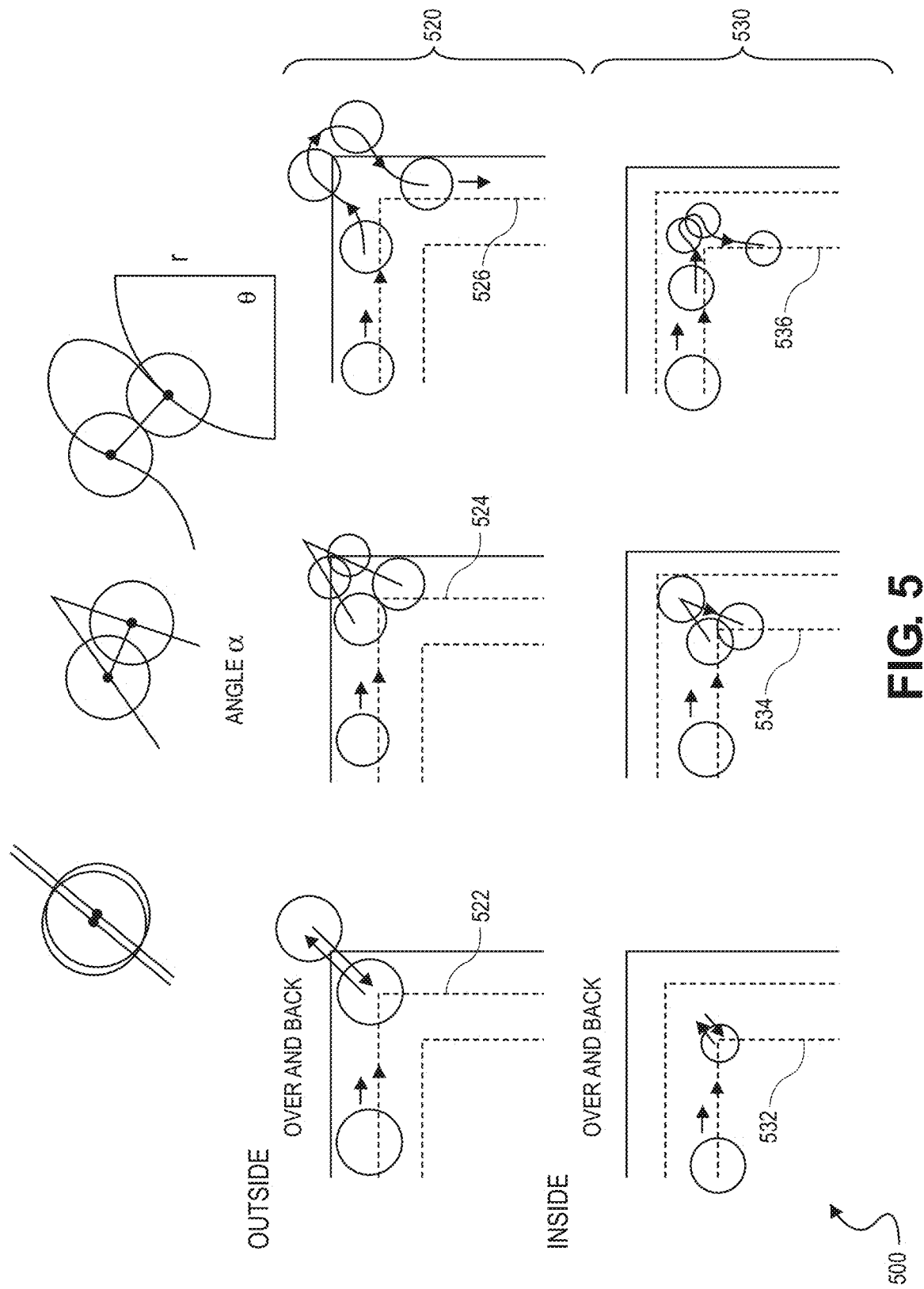
FIG. 5 depicts example corner 3D printing strategies according to various embodiments.

FIG. 5 depicts example corner 3D printing strategies 500 according to various embodiments. FIG. 5 depicts outside corners 520 and inside corners 530. In general, both inside corners and outside corners may be extrusion paths along right or acute angles. For outside corners, the paste may be deposited adjacent to a negative feature, where the negative feature is on the reflex side of the angle. For inside corners, the paste may not be deposited adjacent to a negative feature present on the reflex side of the angle. For example, for inside corners, the extrusion path may be adjacent other extrusion paths. In general, outside corners may be at risk for paste overflowing the side into the negative feature, whereas insider corners may be at risk for overextrusion, which may negatively affect subsequent layers.

In general, corners may be rendered in an elongated or stretched manner such that the extruded paste can be easily deposited by a Computer Numerical Control (CNC) movement system. Such elongated or stretched corners may include an intentionally elongated extruded road at an acute angle. For elongated or stretched corners, splitting the toolpath into separated out and back routes can minimize or reduce the overlap of extrusion paths. The dispense rate may be kept constant or reduced such that overlapping regions do not produce the defects associated with overextrusion. In general, the dispense rate may be characterized as the feed rate of a linear axis inside the printing tool. The dispense rate may be controlled by a motor that moves material through an extruder independent of the other axes. In the specific case of an extruder, the dispense rate may be characterized as the speed at which a material is moved through an extruder. As shown in FIG. 5, elongated or stretched corners can be rendered linearly, as in corners 522, 532, triangularly for corner 524, 534 or parabolically for corners 526, 536. Triangularly rendered corners 524, 534 may have any acute angle that defines the triangle, which has legs that start at the "deviation point" at which the toolpath deviates from the exact shape of the corner. Corners may be parabolically rounded, e.g., for corners 526, 536, or radially rounded. Triangular rendered corners 524, 534 may be characterized according to the angle α of the legs of the triangle. (Linearly rendered corners 522, 532, may be characterized as triangularly rendered corners in which the inside angle is zero.) Parabolically rendered corners 526, 536 may be characterized according to the angle θ and radius r of their shoulder portion.

In general, for different situations, the shape of the elongated or stretched corner may be selected for reducing or minimizing any of various defects in the printed layer, e.g., that occur as a result of extruding too much material. For inside corners extruded during a printing operation, for example an inside perimeter which will subsequently have a concentric outside perimeter, the linear or triangular shape may be preferred, as they most efficiently fill the gap in a short amount of time. For outside corners, e.g., where paste overflow is a risk, a lower curvature path can reduce or minimize paste overflow over the sides of the part.

In general, slicers enforce rules to prevent or minimize road overlap. The corner 3D printing strategies 500 as shown in FIG. 5 illustrate examples of relaxing such rules to permit toolpaths that double back within a road width and therefore include some amount of overlap, as shown by the intersecting circles that represent road widths in FIG. 5. According to some embodiments, such rules may be relaxed or omitted in situation such as illustrated in FIG. 5. For example, the rules may be relaxed to permit a lateral overlap distance to be no more than some defined distance that is less than twice the road width. The overlap of elongated and stretched corners may be quantized as the average distance between the out and back paths. Another example of when such rules may be relaxed or omitted is in the case of chopped loop paths.

Figure 6:
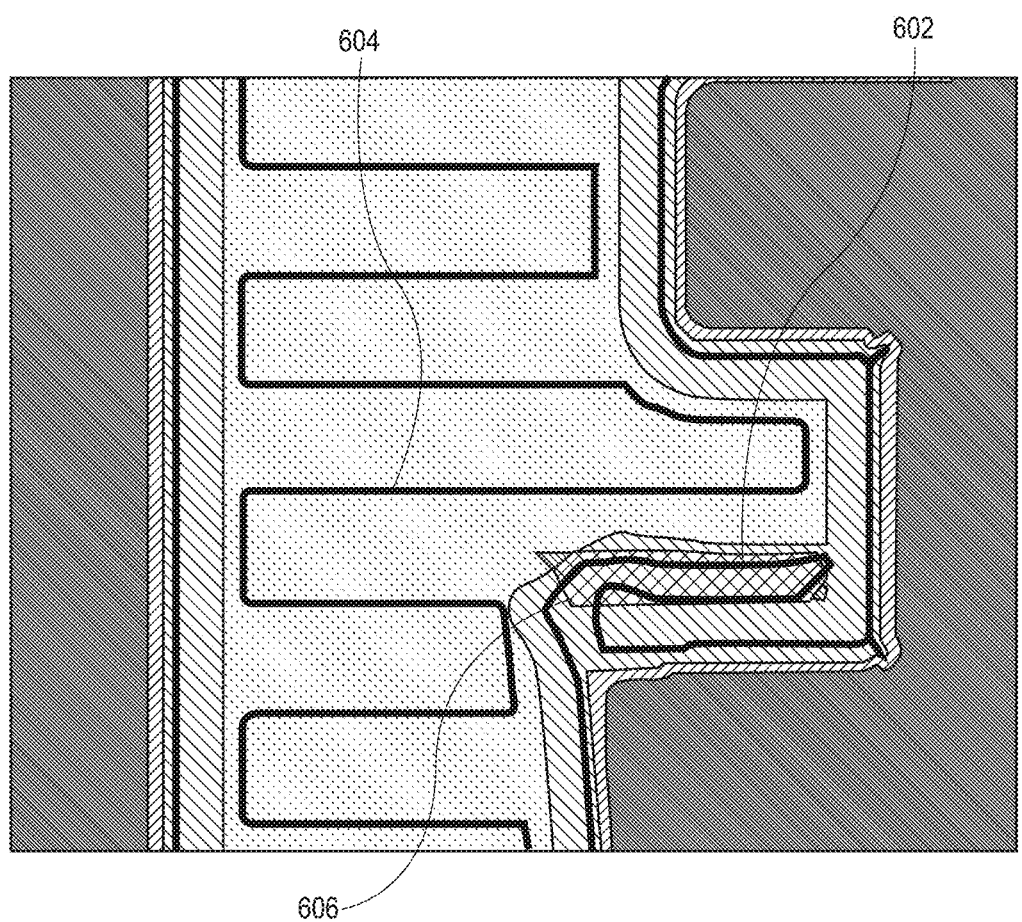
FIG. 6 depicts a chopped loop according to various embodiments.

FIG. 6 depicts a chopped loop 602 according to various embodiments. As shown in FIG. 6, an initial toolpath 604 would leave a void in the area 606 because the distance of the toolpath 604 from the perimeter of the area 606 is larger than the road width so that area cannot be infilled using part of the toolpath 604. In general, chopped loop paths are an infill strategy to extrude material in locations where normal infill cannot fit roads of a predetermined width. Chopped loops may fill residual areas, which are undesirable voids that cannot be filled using roads of a predetermined width due to one or more dimensions of the shape being a non-integer multiple of the predetermined width. Chopped loops may be connected to another toolpath at two points and/or may have a width smaller than that of the road width of the normal infill roads. They can have different road widths or otherwise violate the general slicing overlap rule. Chopped loops may be open, such as chopped loop 602, or may be closed, that is, may connect to themselves.

Figure 7:
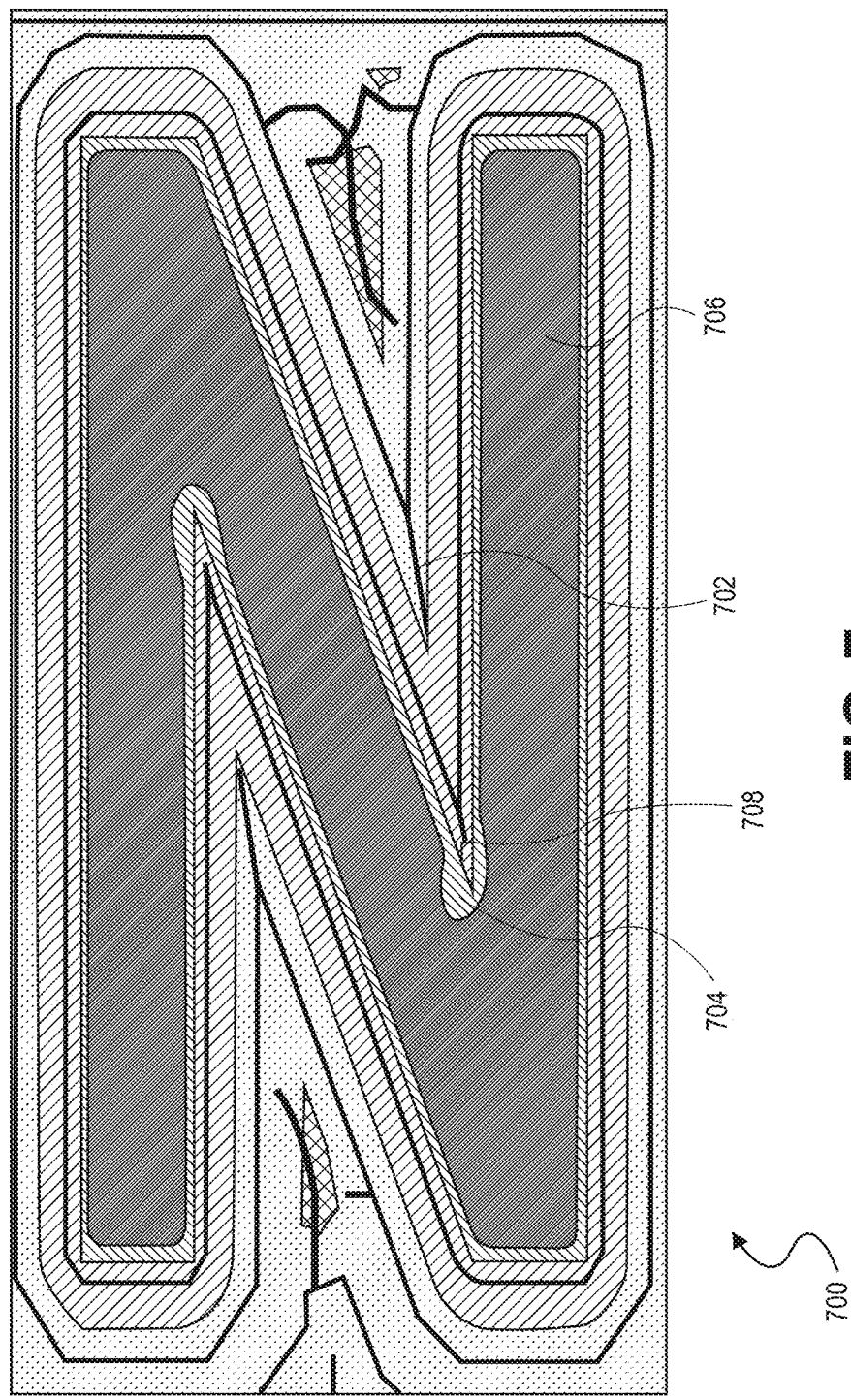
FIG. 7 depicts a virtual extrusion rendering of a layer of the object of FIG. 2 using a toolpath according to various embodiments.

FIG. 7 depicts a virtual extrusion rendering 700 of a layer of object 200 of FIG. 2 using a toolpath according to various embodiments. In particular, the virtual extrusion rendering 700 represents an improved toolpath in comparison to the toolpath for the same layer of object 200 as depicted in FIG. 3, as it includes elongated or stretched corners 702, 708 as shown and described herein in reference to FIG. 5. For example, the toolpath of FIG. 7 corrects the undesirable void 306 at an outside corner by implementing the stretched corner 708. The stretched corner 708 at the outside corner may introduce extra paste 704 into the negative feature 706; however, the extra paste may be machined away in the subtractive step. As another example, the toolpath of FIG. 7 corrects the undesirable void 308 at an inside corner by implementing the stretch corner 702. The stretched corner 702 at the inside corner does not introduce any extra paste in the negative feature 706. Accordingly, the part that includes the layer produced according to virtual extrusion rendering 700 will lack the undesirable voids in the crooks of the acute angles of the Z-shaped negative feature 706, as compared to the undesirable voids 306, 308 that are present in the crooks of the acute angles of Z-shaped negative feature 302 as shown and described herein in reference to FIG. 3.

According to various embodiments, additional paste 704 may be detected prior to physically printing the object layer represented by virtual extrusion rendering 700. Similar to the technique shown and described herein in reference to FIG. 3, additional paster 704 may be detected by comparing the virtual extrusion rendering 700 with a corresponding horizontal section of the 3D virtual representation of the object 200 as shown in FIG. 2. The horizontal section of the 3D virtual representation of the object 200 that corresponds to the virtual extrusion rendering 700 layer may be registered to the virtual extrusion rendering 700. After such registration, areas of the virtual extrusion rendering 300 that do not intersect the horizontal section correspond to additional paste 704.

Figure 8:
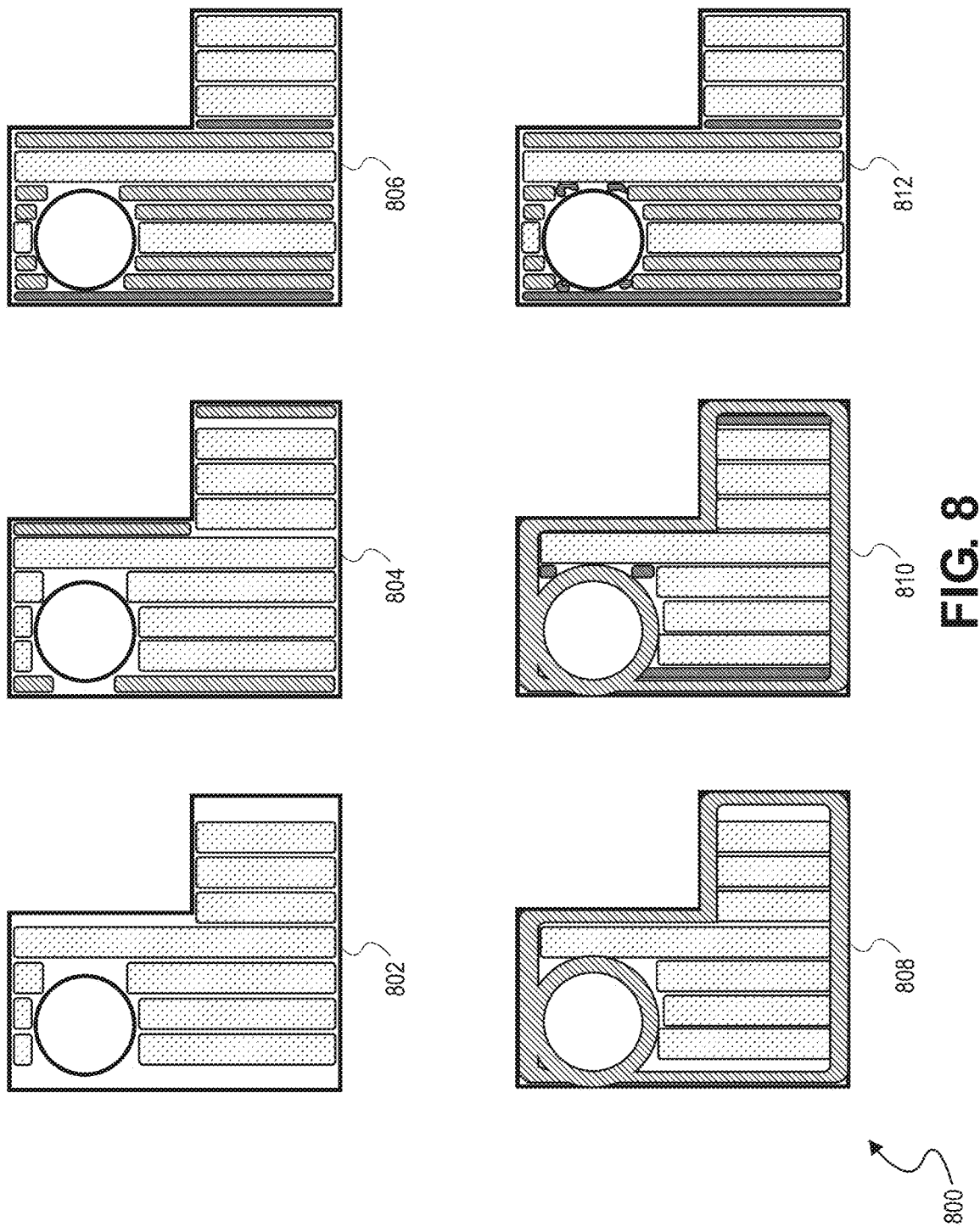
FIG. 8 depicts example 3D printing strategies according to various embodiments.

FIG. 8 depicts example 3D printing strategies 800 according to various embodiments. As shown in FIG. 8, each 3D printing strategy is for an L-shaped layer that defines a circular hole at the top, an intentional negative feature. Each 3D printing strategy is depicted in the form of a virtual extrusion rendering. Some embodiments sequentially apply roads of different widths, using smaller roads to fill the areas missed by the larger roads. Multiple road widths may be extruded without requiring changes to the 3D printing hardware. For example, a 0.9 mm extrusion orifice may produce roads of any width from 0.5 mm to 1.3 mm. In general, roads can be created with dimensions finer than the orifice diameter in some extrusion technologies due to the flow of liquid material at a given height, as shown and described presently in reference to FIG. 9.

Figure 9:
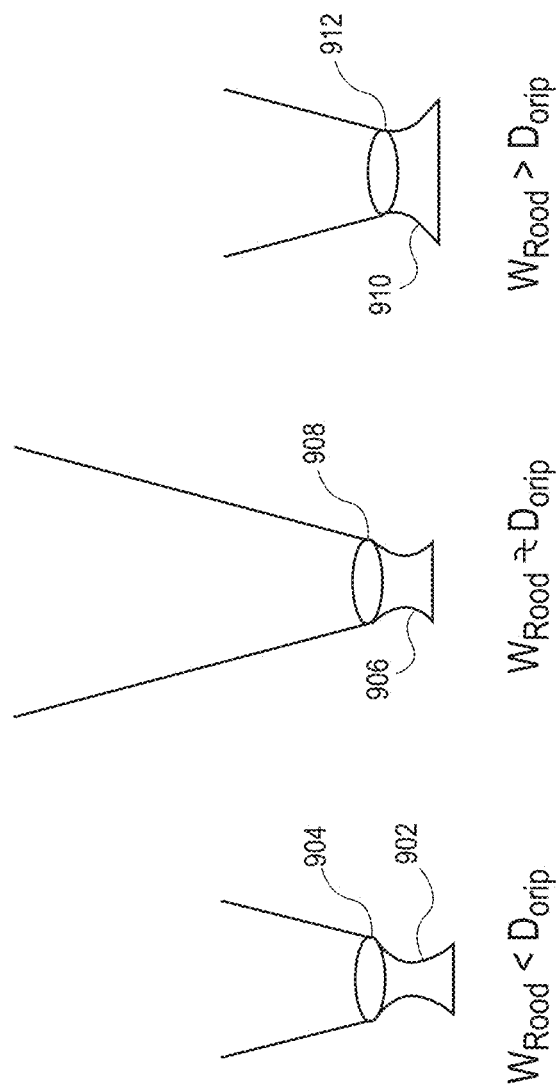
FIG. 9 depicts an extrusion orifice producing roads of various widths.

FIG. 9 depicts an extrusion orifice producing roads of various widths. As shown in FIG. 9, the same extrusion orifice 904, 908, 912 with an orifice diameter of $D_{Orif}$ can produce roads of various widths. The extrusion orifice 904 is shown producing a road 902 having a width of $W_{Road}$, which is less than the diameter of the extrusion orifice, i.e., $W_{Road} < D_{Orif}$. Further, the extrusion orifice 908 is shown producing a road 906 having a width of $W_{Road}$, which is approximately the same as the diameter of the extrusion orifice, i.e., $W_{Road} \approx D_{Orif}$. Yet further, the extrusion orifice 912 is shown producing a road 910 having a width of $W_{Road}$, which is greater than the diameter of the extrusion orifice, i.e., $W_{Road} > D_{Orif}$.

Returning to FIG. 8, 3D printing strategy 802 illustrates that a single road with may be insufficient to fill all desired areas. Some embodiments utilize two road widths, e.g., as shown in 3D printing strategies 804 and 808, both of which include a first road (or set of roads) with a first road width and a second road (or set of roads) with a second road width. Some embodiments utilize three road widths, e.g., as shown in 3D printing strategies 806 and 810, both of which include a first road (or set of roads) with a first road width, a second road (or set of roads) with a second road width, and a third road (or set of roads) with a third road width. More than three road widths may also be used according to some embodiments, e.g., as shown in 3D printing strategy 812, which includes a first road (or set of roads) with a first road width, a second road (or set of roads) with a second road width, a third road (or set of roads) with a third road width, and a fourth road (or set of roads) with a fourth road width.

3D printing strategies 802, 804, 806, and 812 utilize only rectilinear toolpaths. However, embodiments are not so limited. Some embodiments utilize 3D printing strategies that include perimeter and/or concentric roads, e.g., roads that are curved around negative features or object perimeters. 3D printing strategies 808 and 810 illustrate 3D printing strategies that include both rectilinear and perimeter roads. Both 3D printing strategies 808 and 810 include perimeter roads about their respective layer perimeters and about the circular negative features.

Further, the rectilinear toolpaths in 3D printing strategies 802, 804, 806, and 812 are open, i.e., with different start/stop locations for the various toolpaths. However, embodiments are not so limited. Other rectilinear toolpaths may zig/zag up and down in order to minimize or reduce the number of start/stops.

Each successive 3D printing strategy 802, 804, 806, 808, 810, and 812 produces fewer undesirable voids than the previous 3D printing strategy. However, some 3D printing strategies include more roads than others. In general, embodiments may select a 3D printing strategy that produces few or no undesirable voids while requiring few roads.

Some embodiments may select from among several 3D printing strategies that have no more than a specified, e.g., user-selected, number of distinct roads.

Some embodiments utilize a 3D printing strategy that include one or more planar rotation. Such planar rotations may rotate the deposited extrusion layer within the XY plane about any point on or not on the layer by any angle. By way of non-limiting example, such planar rotations may be useful for filling a space that is generally rectilinear and at an angle to another space that is generally rectilinear, where the angle is not a multiple of 90°.

In general, embodiments may utilize, e.g., compare with respect to produced undesirable roads, any of a variety of different 3D printing strategies, not limited to those shown and described herein in reference to FIG. 8. Non-limiting example 3D printing strategies include:

- Baseline rectilinear space filling with a single road width;
- Rectilinear space filling with two road widths;
- Rectilinear space filling with three road widths;
- Rectilinear space filling with any number of road widths and with one or more perimeter and/or concentric road types;
- Rectilinear space filling with any number of road widths and with one or more perimeter and/or concentric roads of multiple widths;
- Any of the above strategies with the addition of spot filling with chopped loop paths to fill residual spaces;
- Any of the above strategies with the addition of planar rotation to improve space filling in one or more identified regions; and
- Any of the above strategies with the addition of one or more preset custom toolpaths to fill one or more identified regions.

Figure 10:
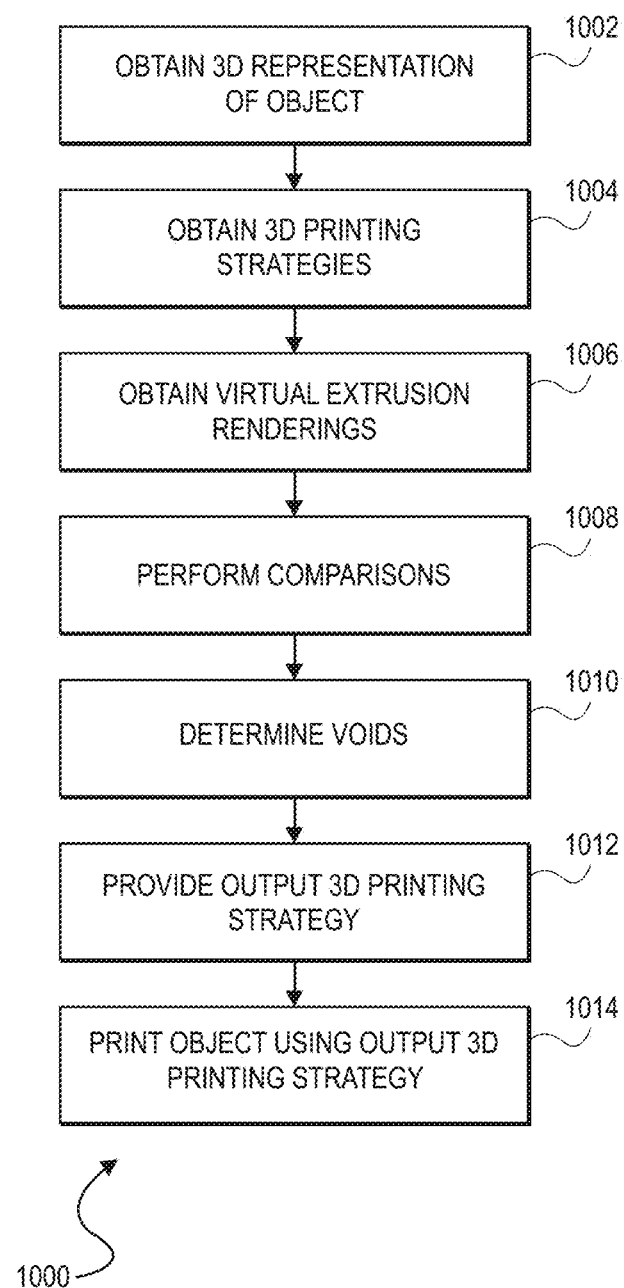
FIG. 10 is flow chart for a technique of printing a 3D object according to various embodiments.

FIG. 10 is flow chart for a technique 1000 of printing a 3D object according to various embodiments. The technique may be implemented in a hybrid printing process, which may include an additive step, a transformative step, and a subtractive step. The technique 1000 may be at least partially computer implemented and may include 3D printing an object. The technique 1000 may be implemented using software that is integrated as part of a slicer. Alternately, or in addition, the technique 1000 may be used together with a slicer, e.g., as a plug-in or standalone module that communicates with a slicer. For example, according to some embodiments, a slicer provides one or more 3D printing strategies to the technique 1000 per block 1004. The technique 1000 is not limited to these implementation examples.

At block 1002, the technique 1000 obtains a 3D representation of an object. In general, the object corresponds to an object that is to be 3D printed using a hybrid printing process. Any of a variety of 3D representations may be obtained. According to some embodiments, the 3D representation may be in the form of, or derived from, a CAD file. According to some embodiments, the 3D representation may be in the form of a mesh. According to some embodiments, the 3D representation may be in the form of a layer of an object. According to some embodiments, the 3D representation may be in the form of an entire object. Other embodiments may use other forms of 3D representations of an object.

At block 1004, the technique 1000 obtains a plurality of 3D printing strategies. According to embodiments in which the technique 1000 is integrated with a slicer, the 3D printing strategies may be generated by the slicer and provided to the technique 1000. According to embodiments in which the technique 1000 is used together with a separate slicer, the 3D printing strategies may be communicated by the slicer to the technique 1000. According to various embodiments, at 1004, many possible 3D printing strategies may be obtained at 1004.

According to some embodiments, the 3D printing strategies may be in the form of specific toolpaths. According to some embodiments, the 3D printing strategies may be in the form of a GCode file. According to some embodiments, the 3D printing strategies may be in the form of a series of instruction schema. Such schema may include any, or a combination, of, by way of non-limiting examples: any of the corner 3D printing strategies as shown and described in reference to FIG. 5, and/or any of the 3D printing strategies as shown and described in reference to FIG. 10. According to some embodiments, the 3D printing strategies may specify one or more road widths, one or more rectilinear road, one or more perimeter road, one or more concentric roads, and/or one or more preset custom toolpath. Some or all of the 3D printing strategies may include corrective strategies, such as one or more chopped loop and/or one or more stretched or elongated corner.

At block 1006, the method 1000 obtains virtual extrusion renderings for each of the 3D printing strategies obtained at block 1004. Each virtual extrusion rendering may be as described herein in reference to any of FIGS. 1 and 3-8. Each virtual extrusion rendering may represent road areas generated by, for example, passing the center of a circle with diameter equal to the road width along the toolpaths of the 3D printing strategies. Multiple road widths and shapes may be represented by the virtual extrusion renderings.

At block 1008, the technique 1000 performs comparisons of the respective virtual extrusion renderings obtained at 1006 to the 3D representation of the object obtained at 1002. The comparisons may be performed as shown and described in reference to FIGS. 3 and 7. For example, for each 3D representation obtained at 1002, a horizontal section that corresponds to the layer of the respective virtual extrusion rendering obtained at 1006 may be identified. Each horizontal section may be registered to its respective virtual extrusion rendering. After such registration, areas of the horizontal section that do not intersect the virtual extrusion rendering, which correspond to undesirable voids, may be identified. According to some embodiments, areas of the virtual extrusion rendering that do not intersect the horizontal section, which correspond to additional paste, may be identified. (Once printed, such additional paste may subsequently be removed in the subtractive step of the 3D printing process.)

At block 1010, technique 1000 determines undesirable voids identified by each comparison of 1008. For example, the undesirable voids may be identified as the areas of the horizontal sections that do not intersect their respective virtual extrusion renderings. According to some embodiments, the total area of such identified undesirable voids may be determined as part of 1010. Thus, each 3D printing strategy obtained at 1004 may be associated with a total undesirable void area.

According to various embodiments, the actions of blocks 1004 (obtaining printing strategies), 1006 (obtaining virtual extrusion renderings), 1008 (performing comparisons), and 1010 (determining) may be performed for each layer and/or for all layers cumulatively. This iterative approach may result in obtaining an output printing strategy with greatly reduced undesirable voids.

At block 1012, the technique 1000 provides an output 3D printing strategy. The output 3D printing strategy may be provided from among the 3D printing strategies obtained at 1004 according any of a variety of criteria or selections.

According to some embodiments, the output 3D printing strategy is selected as the 3D printing strategy with the smallest undesirable void area. According to such embodiments, when multiple 3D printing strategies have similar amounts of undesirable voids, e.g., within 5% of each-other, the 3D printing strategy that uses the fewest toolpaths may be selected. According to some embodiments, the output 3D printing strategy is selected by a user. According to such embodiments, the technique 1000 may display representations of the comparisons of 1008 with the undesirable voids identified at 1010 highlighted (e.g., set off in a particular color or shading). According to such embodiments, the area of each undesirable void, and/or the total undesirable void area for each printing strategy, may be displayed. According to such embodiments, a user may select from among the 3D printing strategies by, for example, clicking on an icon representative of a particular strategy.

According to some embodiments, the output 3D printing strategy may be provided to a 3D printer. According to some embodiments, the output 3D printing strategy may be provided for storage on computer readable media, or for delivery to a recipient, e.g., over a computer network.

At block 1014, the technique 1000 prints the object based on the output 3D printing strategy. The technique 1000 may do so by applying the output 3D printing strategy as part of a hybrid printing process.

Many variations and modifications of the technique 1000 are possible. For example, some embodiments repeat the actions of blocks 1006, 1008, and 1010 for multiple layers of an object. According to such embodiments, the 3D printing strategies obtained at 1004 may include 3D printing strategies for multiple layers. The areas of the determined undesirable voids may be summed and displayed from among the various layers within a particular 3D printing strategy. Alternately, or in addition, the maximum undesirable void areas from among the various layers of each particular 3D printing strategy may be summed and displayed. According to embodiments in which the output 3D printing strategy of 1012 is selected automatically, such output 3D printing strategy may be selected as the 3D printing strategy with the smallest area of total undesirable void, or the 3D printing strategy with the smallest area of undesirable void in the layer having the maximum undesirable void area.

As further examples of variations, according to some embodiments, the technique 1000 obtain a first 3D printing strategy at block 1004. At block 1006, the technique 1000 obtains a first virtual extrusion rendering based on the first 3D printing strategy. At block 1008, the technique 1000 performs a first comparison of the first virtual extrusion rendering obtained at 1006 to the 3D representation of the object obtained at 1002. At block 1010, technique 1000 determines undesirable voids identified by the first comparison of 1008. The result of the comparison and void determination may be represented by the rendering shown in FIGS. 3, by way of non-limiting example. According to these embodiments, the technique 1000 provides a second 3D printing strategy by modifying the first 3D printing strategy to reduce the undesirable voids identified by the first comparison. The second 3D printing strategy may include corrective strategies, such as one or more chopped loops and/or one or more stretched or elongated corners. According to these embodiments, the technique 1000 applies blocks 1006 through 1010 to the second 3D printing strategy, that is, obtains a second virtual extrusion rendering based on the second 3D printing strategy, performs a second comparison of the second virtual extrusion rendering to the 3D representation of the object, and determines the undesirable voids identified by the second comparison. The result of the second comparison and void determination may be represented by the rendering shown in FIG. 5, by way of non-limiting example. In some embodiments, the technique 1000 may optionally provide a third 3D printing strategy by modifying the second 3D printing strategy to further reduce the undesirable voids identified by the third comparison. This third 3D printing strategy may include additional corrective strategies such as one or more additional chopped loops and/or one or more additional stretched or elongated corners. In these embodiments, the technique 1000 applies blocks 1006, 1008, and 1010 to the third 3D printing strategy. In some embodiments, the technique 1000 may go through sequential loops of blocks 1004 through 1010 in which an n-th 3D printing strategy, with n being any integer number above 3, is generated with the result of further reducing the undesirable voids. At block 1012, the technique 1000 provides an output 3D printing strategy. According to some embodiments, the decision on whether the output 3D printing is the second 3D printing strategy, the third, or the n-th 3D printing strategy, that is, when the loop of blocks 1004, 1008, and 1010 is stopped, may be determined by comparing the undesirable void area to a target value. According to some embodiments, the loop of blocks 1004, 1008, and 1010 may be stopped only when the undesirable void area becomes smaller than the target value. According to some embodiments, the output 3D printing strategy is the second 3D printing strategy, the third 3D printing strategy, or the n-th 3D printing strategy; that is no, comparison of the undesirable void area with a target value is performed.

As yet further examples of variations, according to some embodiments, after obtaining a first 3D printing strategy, obtaining a first virtual extrusion rendering, performing a first comparison of the first virtual extrusion rendering to the 3D representation of the object, and determining the undesirable voids identified by the first comparison, the technique 1000 obtains a plurality of 3D printing strategies by applying different corrective strategies to the first 3D printing strategy to reduce the undesirable voids identified by the first comparison. These corrective strategies may include one or more chopped loops and/or one or more stretched or elongated corners. In these embodiments, the technique 1000 obtains a virtual extrusion rendering, performs a comparison of the virtual extrusion rendering to the 3D representation of the object, and determines the undesirable voids for each one of the plurality of 3D printing strategies. In these embodiments, the output 3D printing strategy may be provided from among the plurality of 3D printing strategies obtained after modifying the first 3D printing strategy according any of a variety of criteria or selections. According to some embodiments, the output 3D printing strategy is selected as the 3D printing strategy with the smallest undesirable void area.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of printing a three-dimensional (3D) object, the method comprising:
    obtaining a 3D virtual representation of the 3D object generated according to a computer-aided design (CAD) rendering;
    obtaining a first 3D printing strategy;
    obtaining a second 3D printing strategy;
    obtaining a first virtual extrusion rendering, wherein the first virtual extrusion rendering corresponds to a first toolpath for a deposition layer of the 3D object according to the first 3D printing strategy;
    obtaining a second virtual extrusion rendering, wherein the second virtual extrusion rendering corresponds to a second toolpath for a deposition layer of the 3D object according to the second 3D printing strategy;
    performing a first comparison of the first virtual extrusion rendering to a corresponding portion of the 3D virtual representation of the 3D object;
    determining, based on the first comparison, a first region of the 3D object that does not intersect the first virtual extrusion rendering;
    performing a second comparison of the second virtual extrusion rendering to a corresponding portion of the 3D virtual representation of the 3D object;
    determining, based on the second comparison, a second region of the 3D object that does not intersect the second virtual extrusion rendering;
    providing, to a 3D printer, an output 3D printing strategy for the deposition layer of the 3D object selected from among the first 3D printing strategy and the second 3D printing strategy based on the first region of the 3D object and the second region of the 3D object; and
    printing, by the 3D printer, the 3D object using the output 3D printing strategy.

2. The method of claim 1, further comprising:
    determining a size of the first region and a size of the second region, and
    selecting, automatically, the output printing strategy based at least on a comparison of the size of the first region to the size of the second region.

3. The method of claim 1, further comprising:
    displaying a representation of the first comparison;
    displaying a representation of the second comparison; and
    receiving a user selection of the output 3D printing strategy from among the first 3D printing strategy and the second 3D printing strategy.

4. The method of claim 1, wherein at least one of the first 3D printing strategy or the second 3D printing strategy comprises roads of a plurality of different widths.

5. The method of claim 1, wherein at least one of the first 3D printing strategy or the second 3D printing strategy comprises a rectilinear toolpath and a concentric toolpath.

6. The method of claim 1, wherein at least one of the first 3D printing strategy or the second 3D printing strategy comprises a toolpath for a deposition layer of the 3D object having an angle less than 180°, and wherein the output 3D printing strategy comprises a toolpath on an exterior of the angle adjacent to a negative feature.

7. The method of claim 1, wherein at least one of the first 3D printing strategy or the second 3D printing strategy comprises a chopped loop toolpath.

8. The method of claim 1, wherein at least one of the first 3D printing strategy or the second 3D printing strategy comprises an elongated or stretched corner.

9. The method of claim 1, wherein the performing the first comparison of the first virtual extrusion rendering to the corresponding portion of the 3D virtual representation of the 3D object comprises comparing the first virtual extrusion rendering to a virtual slice of the 3D virtual representation of the 3D object, and wherein the performing the second comparison of the second virtual extrusion rendering to the corresponding portion of the 3D virtual representation of the 3D object comprises comparing the second virtual extrusion rendering to a virtual slice of the 3D virtual representation of the 3D object.

10. The method of claim 1, wherein
    the obtaining a 3D virtual representation of the 3D object,
    the obtaining a first 3D printing strategy,
    the obtaining a second 3D printing strategy,
    the obtaining a first virtual extrusion rendering,
    the obtaining a second virtual extrusion rendering,
    the performing a first comparison,
    the determining a first region of the 3D object that does not intersect the first virtual extrusion rendering,
    the performing a second comparison, and
    the determining a second region of the 3D object that does not intersect the second virtual extrusion rendering,
    are performed for each of a plurality of deposition layers of the 3D object.

11. The method of claim 1, wherein the second 3D printing strategy comprises a modification of the first 3D printing strategy, and wherein the providing the output 3D printing strategy comprises providing the second 3D printing strategy.

12. A system for printing a three-dimensional (3D) object, the system comprising an electronic processor and persistent memory comprising instructions that, when executed by the electronic processor, configure the electronic processor to perform actions comprising:
    obtaining a 3D virtual representation of the 3D object generated according to a computer-aided design (CAD) rendering;
    obtaining a first 3D printing strategy;
    obtaining a second 3D printing strategy;
    obtaining a first virtual extrusion rendering, wherein the first virtual extrusion rendering corresponds to a first toolpath for a deposition layer of the 3D object according to the first 3D printing strategy;
    obtaining a second virtual extrusion rendering, wherein the second virtual extrusion rendering corresponds to a second toolpath for a deposition layer of the 3D object according to the second 3D printing strategy;
    performing a first comparison of the first virtual extrusion rendering to a corresponding portion of the 3D virtual representation of the 3D object;
    determining, based on the first comparison, a first region of the 3D object that does not intersect the first virtual extrusion rendering;

performing a second comparison of the second virtual extrusion rendering to a corresponding portion of the 3D virtual representation of the 3D object;

determining, based on the second comparison, a second region of the 3D object that does not intersect the second virtual extrusion rendering; and providing, to a 3D printer, an output 3D printing strategy for the deposition layer of the 3D object selected from among the first 3D printing strategy and the second 3D printing strategy based on the first region of the 3D object and the second region of the 3D object; and printing, by the 3D printer, the 3D object using the output 3D printing strategy.

13. The system of claim 12, wherein the actions further comprise:

determining a size of the first region and a size of the second region, and selecting, automatically, the output printing strategy based at least on a comparison of the size of the first region to the size of the second region.

14. The system of claim 12, wherein the actions further comprise:

displaying a representation of the first comparison;

displaying a representation of the second comparison; and receiving a user selection of the output 3D printing strategy from among the first 3D printing strategy and the second 3D printing strategy.

15. The system of claim 12, wherein at least one of the first 3D printing strategy or the second 3D printing strategy comprises roads of a plurality of different widths.

16. The system of claim 12, wherein at least one of the first 3D printing strategy or the second 3D printing strategy comprises a rectilinear toolpath and a concentric toolpath.

17. The system of claim 12, wherein at least one of the first 3D printing strategy or the second 3D printing strategy comprises a toolpath for a deposition layer of the 3D object having an angle less than 180°, and wherein the output 3D printing strategy comprises a toolpath on an exterior of the angle adjacent to a negative feature.

18. The system of claim 12, wherein at least one of the first 3D printing strategy or the second 3D printing strategy comprises a chopped loop toolpath.

19. The system of claim 12, wherein at least one of the first 3D printing strategy or the second 3D printing strategy comprises an elongated or stretched corner.

20. The system of claim 12, wherein the performing the first comparison of the first virtual extrusion rendering to the corresponding portion of the 3D virtual representation of the 3D object comprises comparing the first virtual extrusion rendering to a virtual slice of the 3D virtual representation of the 3D object, and wherein the performing the second comparison of the second virtual extrusion rendering to the corresponding portion of the 3D virtual representation of the 3D object comprises comparing the second virtual extrusion rendering to a virtual slice of the 3D of the 3D object.

21. The system of claim 12, wherein the actions further comprise performing for each of a plurality of deposition layers of the 3D object:

the obtaining a 3D virtual representation of the 3D object, the obtaining a first 3D printing strategy, the obtaining a second 3D printing strategy, the obtaining a first virtual extrusion rendering, the obtaining a second virtual extrusion rendering, the performing a first comparison, the determining a first region of the 3D object that does not intersect the first virtual extrusion rendering, the performing a second comparison, and the determining a second region of the 3D object that does not intersect the second virtual extrusion rendering.

22. The system of claim 12, wherein the second 3D printing strategy comprises a modification of the first 3D printing strategy, and wherein the providing the output 3D printing strategy comprises providing the second 3D printing strategy.

* * * * *